(No Model.)
R. A. RIPLEY.
CAMERA.
No. 487,159. Patented Nov. 29, 1892.
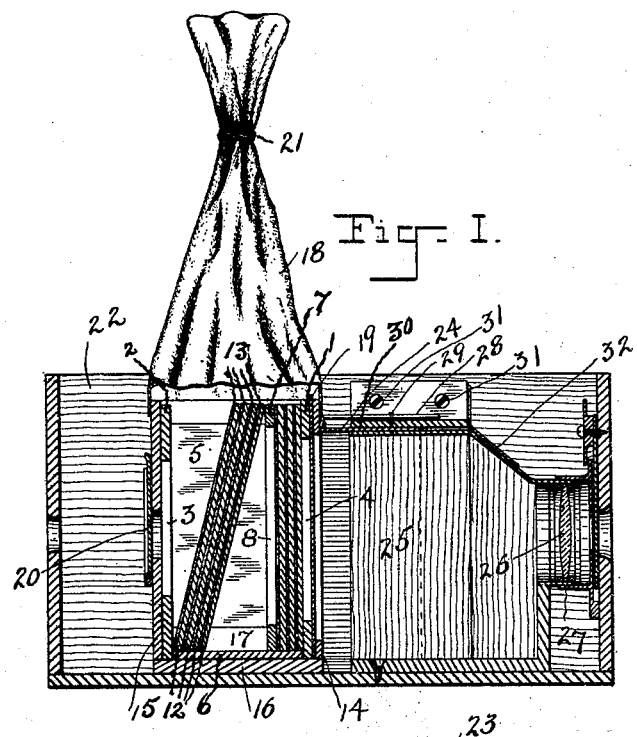
Fig. I.
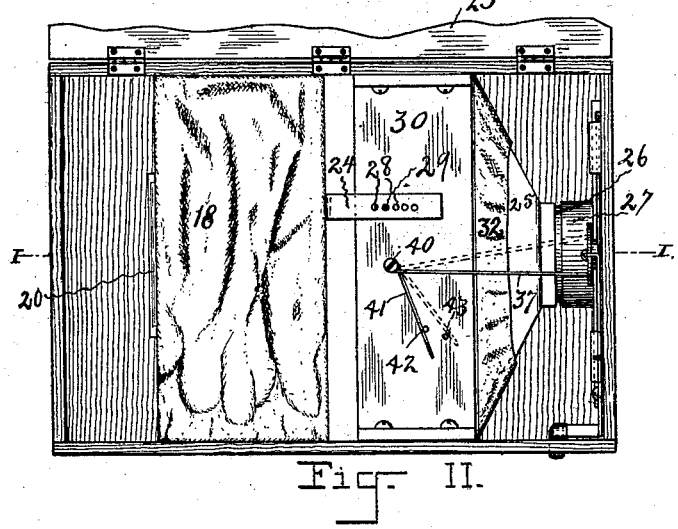
Fig. II.
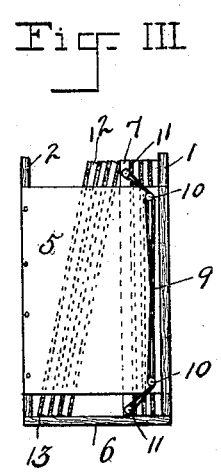
Fig. III
Witnesses
Inventor

UNITED STATES PATENT OFFICE.

ROBERT A. RIPLEY, OF STAMFORD, CONNECTICUT.

CAMERA.

SPECIFICATION forming part of Letters Patent No. 487,159, dated November 29, 1892.

Application filed December 23, 1891. Serial No. 415,990. (No model.)

*To all whom it may concern:*

Be it known that I, ROBERT A. RIPLEY, a citizen of the United States, residing at Stamford, in the county of Fairfield, Connecticut, have invented certain new and useful Improvements in Cameras, of which the following is a specification.

My invention has for its object the production of a camera of extreme simplicity and cheapness which shall be light and portable and capable of containing and exposing a large number of plates from a single magazine or holder.

In the accompanying drawings, Figure I is a longitudinal sectional view on the line I I, Fig. II, of my improved camera, the cover being removed. Fig. II is a plan view of the box with the lid open, the lid being partly broken away. Fig. III is an edge or end view of the plate-holding magazine.

The camera is adapted to work with either plates or films, and its most important feature is the plate-holding magazine, which is adapted to be charged with a large number of plates, limited only by the depth or size of the magazine, and to expose them all in succession without removal from the camera. The magazine proper is shown in detached view at Fig. IV. It consists of two rectangular frames 1 2, having openings 3 4, as shown in Fig. I, and united by side plates 5 and base-plate 6. All these parts are preferably of light wood. Within this open frame I arrange the rectangular follower 7, which is also preferably of light wood and which is open, as shown at 8, Fig. I. This follower is fed automatically with yielding pressure toward the front 1 of the magazine by springs 9, which are arranged entirely on the outside of the magazine. Preferably they are simple rubber bands, which pass over pins 10 10 in the side plates 5 and other pins 11 11 in the ends of follower 7. When worn out they may easily be replaced by the camera owner. It is of course understood that this spring-and-pin arrangement is duplicated on the two ends or edges of the magazine, so that both ends of the follower 7 are drawn forward evenly.

The interior of the magazine is entirely reserved for the plates or films 12 and the opaque separating-sheets 13, except for the slight space taken up by the follower 7. By said follower the unexposed plates are pressed tightly up against the front 1 of the magazine with an even pressure, and the opaque separating-sheets 13, alternating with the plates or films 12, prevent the passage of light beyond the first plate. After an exposure is made the exposed plate, being the front one in the magazine, is withdrawn by hand, together with the separating-sheet 13 immediately in its rear, and is placed with the formerly-exposed plates in the back part of the magazine, the space in which becomes larger as the follower is fed forward on the withdrawal of each plate from its front. My invention comprises means, which will next be described, whereby this removal of an exposed plate and the bringing of the next one automatically into position may be effected by hand and in broad daylight without in any way injuring the unexposed plates.

The magazine having been charged with the proper number of plates, the quantity of which may be so great as to force the follower 7 back into contact with the rear frame 2 of the magazine, it is placed in a holder, (see Fig. I,) which comprises the front open frame 14, the rear perforated plate 15, the base-piece 16, side plates 17 17, and a flexible top 18. Preferably the magazine fits in its holder with sufficient freedom to allow an opaque slide 19 to be placed between the front 1 of the magazine and the front 14 of the holder. A slide 20 also normally covers the aperture in the rear plate 15 of the holder. The flexible top 18 of the holder is of tubular shape, preferably of dark cloth, having one end fastened around the edges of the top of the holder and the other end open to receive the hand or arm of the operator. An elastic 21 maintains the fabric of this flexible sleeve so closely around the arm of the operator as to prevent the admission of light to the magazine. It will be seen, therefore, that at any time, even in broad daylight, the operator can insert his hand into the holder through this sleeve and remove an exposed plate from the front to the back of the magazine without any danger of light striking the plate. The magazine, with its contained plates, may be most easily removed from its holder if the elastic 21 be first slipped off. This magazine and its holder and flexible sleeve can be applied to any camera; but I have devised an especially light and cheap form of camera which it is peculiarly adapted to and which is herein illustrated.

22 is the camera-box, which may have a hinged cover 23. In the rear of this box the magazine-holder can be placed and from it readily removed, and, as is obvious, the operator can carry with him a large number of these magazine-holders, removing one after another from the box 22 when its plates have all been exposed and placing a fresh one therein.

The holder may have opaque extensions 24 on its top and sides, which project over the adjacent part of the camera, thus covering the joint and preventing light from entering the holder. This adjacent or front part 25 of the camera bears the lens and lens-tube 26, which enters a neck 27 on the front of the box 22, the arrangement being such as to exclude side light from the lens. The front 25 of the camera is stationary in the box 22, the focusing being done by shifting the plate-holder. Any desired means can be adopted for shifting the plate-holder. I have here shown it free to move in the box 22, except for a locking-spring 28 and pin 29, one carried by the holder and the other by a cross-bar 30, arranged over the front part 25 of the camera and fixed by screws 31 to the sides of the box 22. Depending from the front of this cross-bar 30 is an opaque cloth 32, and the cross-bar, taken with this cloth, forms a combined light-shield for the joint in the camera and brace for the box 22.

A scale or other known means may be employed for indicating the position of the holder in the box, the scale being, as usual, proportioned so that by reference to it the holder can be moved so as to focus the camera according to the estimated distance of the object therefrom without sighting through the lens; but this camera is also adapted for use where the object is sighted through the lens for focusing. To this end it will be noticed that the camera is open from front to rear, except for the shutter 33, the plates and separating-sheets 12 13, and the slide 20, all of which parts may be so adjusted or removed as to allow sight to be had directly through the camera-box.

Having thus described my invention, the following is what I claim as new therein and desire to secure by Letters Patent:

1. The magazine for plates or films, comprising a frame having in front and rear open plates or frames 1 2 and the open follower spring-pressed toward the front plate 4.

2. The magazine plate-holder comprising the combination of the front and rear plates 1 2, the side plates 5, uniting the plates 1 and 2, the pins 10, attached to the side plates, the follower 7, the pins 11, projecting from the edges of the follower 7 above and below the plates 5, and the springs 9, connecting the pins 10 to the pins 11 and adapted to feed the follower forward, as set forth.

3. The magazine plate-holder comprising the front and rear plates 1 2, formed with openings 3 4 through them, the side plates 5, uniting the plates 1 and 2, the follower 7, having an opening through it, and springs 9, arranged outside of the magazine and adapted to feed the follower forward, as set forth.

4. In a camera, the combination of the plate-magazine having an open follower 7, and springs 9, arranged outside of the magazine, a holder for said magazine open at front and rear and having slides 19 20, and the flexible sleeve fixed at one end at the top of said holder and having an elastic clamp.

5. The combination of the box 22, provided with the front part 25, the rear part thereof including a plate-holding magazine, and a cross-bar 30, fixed to the box 22 and overlying the joint between said part 25 and plate-holder and forming a brace for the camera.

6. The combination of the box 22, provided with the front part 25, the movable plate-holder having extensions overlapping the part 25, the cross-bar 30, fixed to the box, and the pendent shield from said cross-bar, substantially as set forth.

ROBERT A. RIPLEY.

Witnesses:
HARRY E. KNIGHT,
D. J. NEWHAND.